Figure 1:
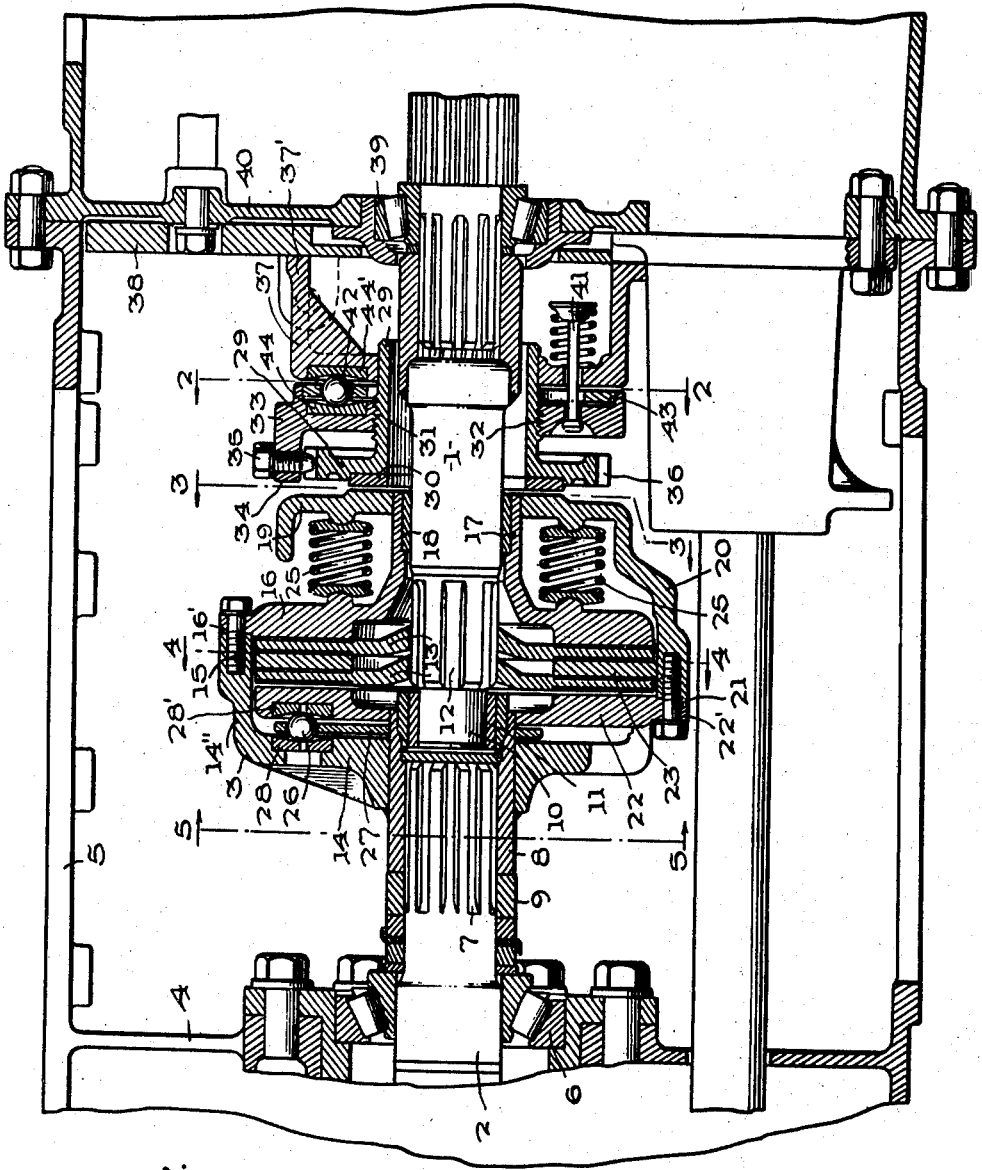

July 27, 1948.   H. T. LAMBERT   2,446,138
CAM ACTUATED CLUTCH

Original Filed Oct. 30, 1944   3 Sheets-Sheet 1

Inventor
H. T. Lambert
By Robb & Robb
Attorneys

July 27, 1948. H. T. LAMBERT 2,446,138
CAM ACTUATED CLUTCH
Original Filed Oct. 30, 1944 3 Sheets—Sheet 2
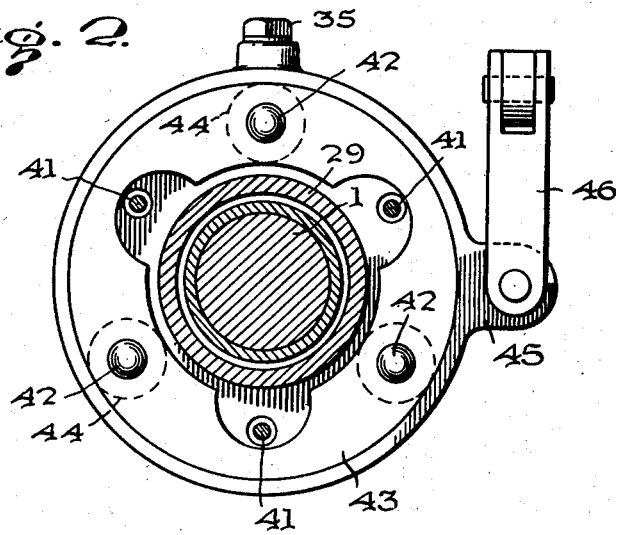
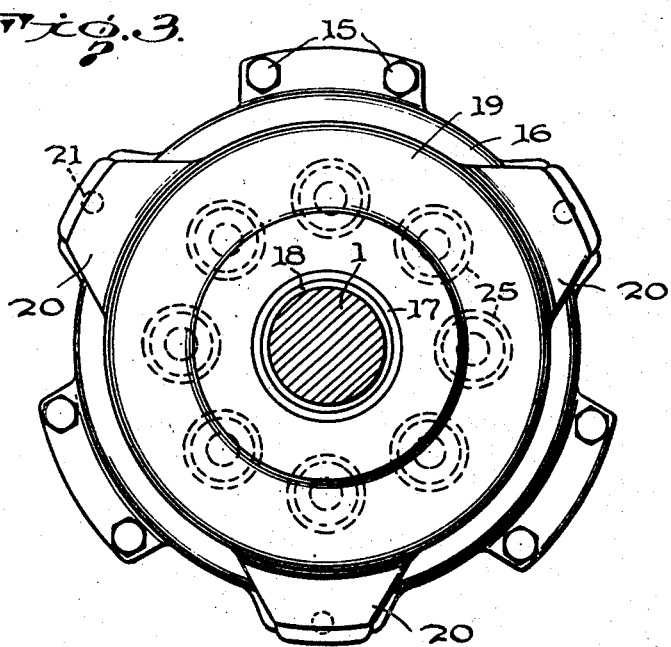
Inventor
H. T. Lambert
By Robert Robb
Attorneys July 27, 1948. H. T. LAMBERT 2,446,138
CAM ACTUATED CLUTCH
Original Filed Oct. 30, 1944 3 Sheets-Sheet 3
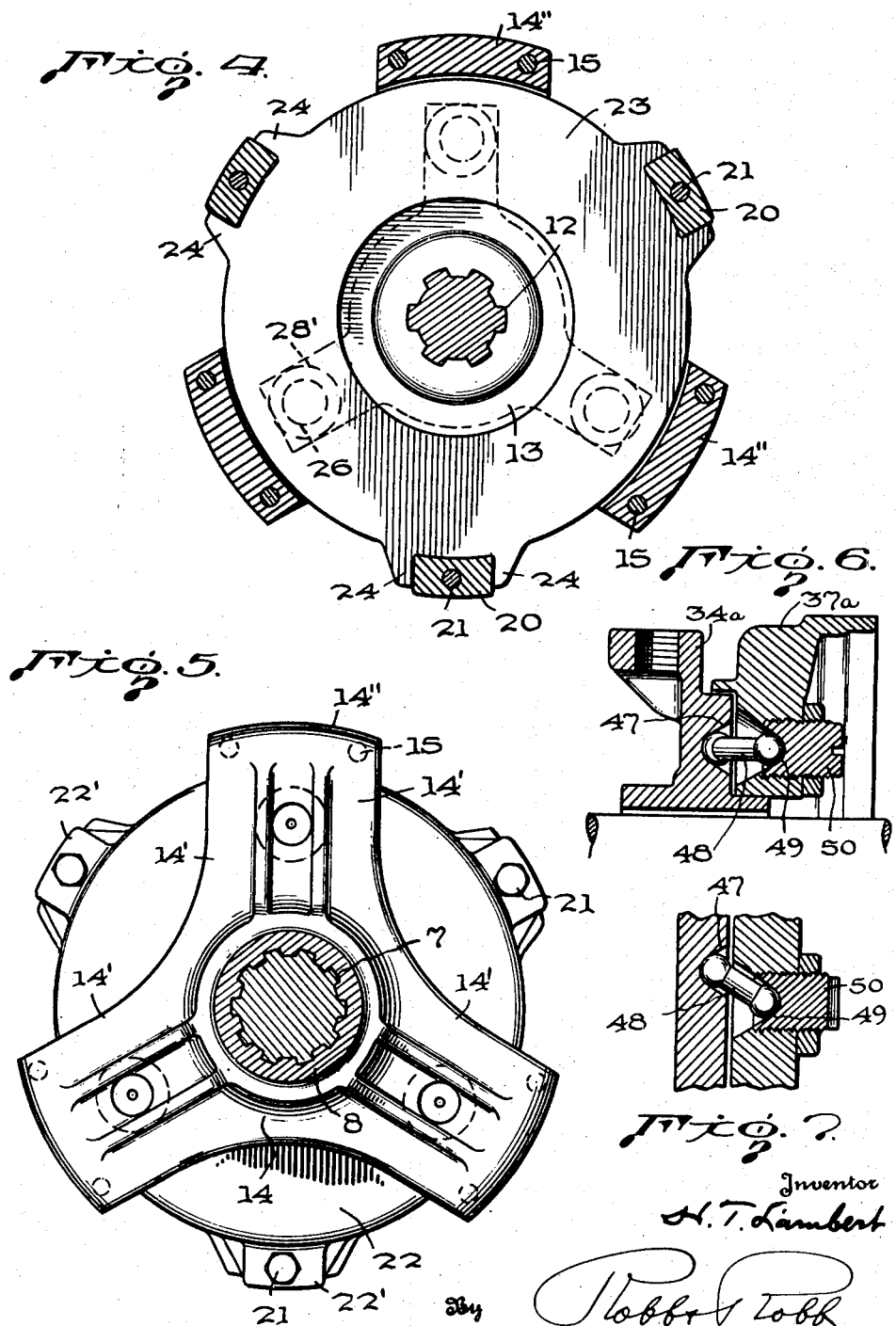

Patented July 27, 1948

2,446,138

UNITED STATES PATENT OFFICE 2,446,138

CAM ACTUATED CLUTCH

Homer T. Lambert, St. Joseph, Mich., assignor to Lambert Brake Corporation, St. Joseph, Mich., a corporation of Michigan Original application October 30, 1944, Serial No. 561,128. Divided and this application October 18, 1945, Serial No. 623,061

4 Claims. (Cl. 192—93)

The present invention relates to improvements in operating mechanisms for power clutches, designed especially for use in automotive vehicles, this application constituting a division of my prior application Serial No. 561,128 now Patent Number 2,407,022, filed October 30, 1944, for Multiple disc energizing clutch.

My invention as herein disclosed is devised to cooperate with a special type of disc clutch as fully set forth and claimed in my prior application aforesaid, and in order that the operation of the mechanism may be clearly understood, the clutch section of the apparatus is hereinafter described in detail in its relationship to the actuator section forming the particular subject matter of the present application.

In the drawings:

Figure 1 is a horizontal sectional view showing the details of construction of my new clutch, together with the operating mechanism therefor and the housing in which these mechanisms are enclosed for splash lubrication;

Figures 2, 3, 4 and 5 are transverse sectional views on the respective lines 2—3, 3—3, 4—4, and 5—5 of Figure 1; and Figures 6 and 7 are fragmentary sectional views of modifications of the adjusting means for taking up wear in the clutch release mechanism.

Like reference characters designate corresponding parts in the several figures of the drawings.

Referring particularly to Figure 1 of the drawings, the clutch mechanism of this invention will first be described, it being understood that this mechanism is intended to be applicable to any construction where power and speed are transferred from a driving to a driven shaft. In the present instance, 1 designates the driving shaft, 2 the driven shaft, and 3 the intermediate clutch mechanism. To provide for the mounting of the clutch, the driven shaft is journalled in the transverse wall 4 of the housing 5 in the bearing 6, the terminus of said shaft being splined, as indicated at 7, and carrying the splined bearing sleeve 8 and spacer collar 9.

The driving shaft 1 is formed with a pilot bearing 10 at its extremity fitted in to the sleeve 8 by means of the adapter bushing 11. Adjacent the pilot bearing, this shaft is provided with a spline section 12 upon which the spaced rotary friction discs 13 are slidingly received. It is to be noted at this point that, while I have illustrated two of such discs, any number of the same may be employed, depending upon the particular power or work to be performed by the clutch in a given application of the mechanism. Motion of the driving shaft 1 is imparted by these discs to the driven shaft through the clutch mechanism of which said discs form a part.

Fixedly secured upon the sleeve 8 is what I term, for the purposes of this description, the power or energizer plate 14, in form, more clearly shown in elevation in Figure 5, composed of three radial rib-reinforced arms 14', each having a horizontal extension 14", bored and threaded to receive a pair of clamping bolts or screws 15. These screws pass through openings in the peripheral extensions 16' of the secondary disc 16. Centrally this disc is formed with a sleeve 17, concentric with and having a bearing at 18 on the driving shaft 1.

Upon the extremity of the sleeve 17 is rotatably and slidably mounted the spring housing 19, having spaced arms 20 disposed between the extensions 14", and each bored and threaded to receive a pair of clamping bolts or screws 21 which pass through openings in peripheral extensions 22' of the primary dics 22. This primary, rotatable disc is journalled upon the end of the splined sleeve 8.

The primary disc, therefore, is disposed in contiguous relation to one of the rotary discs 13, while in opposed relation the secondary disc 16 is disposed in contiguous relation to the other rotary disc 13 hereinbefore referred to. To increase the friction surface of the clutch, I mount between these two rotary discs, or between every pair of such discs employed, an intermediate friction disc 23. As will be seen in Figure 4, the intermediate disc 23 is formed at intervals about its periphery with pairs of lugs 24 to engage about and interlock with the extensions 22' of the primary disc, so that the intermediate disc rotates only when the clutch is engaged, but serves to multiply the frictional grip of the clutch upon the rotary discs 13 when thus engaged.

The clutch action is primarily produced by an annular arrangement of expansion, coiled springs 25 interposed between the housing 19 and the secondary disc 16, but to obtain maximum clutch action, I prefer to use the energizing feature of roller or ball and camming surfaces between the primary disc 22 and the power plate 14, whereby in combination with the multiple disc friction area, a powerful clutch application is produced notwithstanding the reduction in overall size of the unit and the use of an oil bath therefor, as hereinafter described. In the drawings, 26 designates balls in the retainer ring 27, and 28, 28' the respective complementary camming discs.

It is to be understood that a suitable quantity of oil is contained in the housing 5 so that as the clutch unit is rotated the parts are all well lubricated and wear and tear reduced to the absolute minimum.

Control of this clutch mechanism is had by means of the operating unit which will now be specifically described. This operating unit is composed of an adjusting hub 29, the flange 29' of which has seated in its inner face a thrust washer 30 located in contiguous relation to the spring housing 19, but slightly spaced therefrom when the clutch is in engaged position. The outer hub surface is threaded, as at 31, to adjustably receive the internal threads 32 of an actuator disc 33 which is provided with a laterally extending lug 34 through which extends a lock screw 35. The end of this screw interlocks with peripheral teeth 36 on the hub flange. This construction permits adjustment to be readily made as wear takes place in the operating parts of this unit and in initial adjustment of parts.

Next adjacent the hub is arranged the backing disc 37 in which the hub is journalled and slidingly mounted. The annular sleeve or collar extension 37' of the power disc bears against the plate 38 surrounding the bearing 39 of the driving shaft 1 in the transverse wall 40 of the housing 5.

A series of spring tension bolts 41 extend through the backing disc 37 and the actuator disc tending normally to hold the latter with its adjusting hub to the backing disc. Between the actuator disc 33 and the backing disc 37 are arranged a series of balls 42 mounted in a retainer 43 carried by the actuator disc, and these balls coact with camming discs 44, 44' seated in the faces of the actuating and backing discs, respectively.

As shown in Figure 2, the actuator disc 33 is formed with a lug 45 to which a clutch lever (not shown) is connected by a link 46.

I desire it to be understood that the foregoing describes only one form of actuator unit for my clutch, other types being equally applicable as will be understood by those skilled in the art. For example, the energizing balls or rollers in this unit may be replaced by toggle links or pins, as shown in detail in Figures 6 and 7. Referring to these figures, it will be noted that the actuator disc 34a is provided with a plurality of depressions or recesses 47 each to receive the ball extremity of a toggle pin 48, the other similarly shaped ends of the pins seating in corresponding depressions 49 formed in the ends of an adjusting screw 50, there being one such adjusting screw for each toggle pin employed. These screws are mounted in the backing disc 37a surrounding the driving shaft. Figure 7 illustrates the position assumed by the pin when the actuator disc has been shifted by the clutch lever.

Having in view the foregoing description, the operation of the clutch and release thereof will now be described. The position of the clutch elements shown in Figure 1 of the drawings represents the normal clutch disengaged position. When the clutch is applied by the operation of the actuator mechanism, the spring housing 19 shifts on the hub 17 of the secondary disc toward the right, said housing carrying with it the primary plate 22, causing engagement of the friction face thereof with the rotating disc 13 next adjacent the primary disc. The rotation of the disc 13 is picked up by the primary disc and causes the balls 26 to climb the inclined planes of the camming discs 28, 28', which immediately imparts additional axial movement to the primary disc, causing the friction face of the first-mentioned rotary disc 13 to engage the friction face of the intermediate disc 23, then contact with the second rotary disc 13, which is followed by contact of the latter with the secondary disc 16. This servo action, therefore, produces a powerful frictional engagement of the parts in the order named and causes the driven shaft to take up the rotary movement from the energizer plate 14. When the clutch is to be released, the actuator disc 33 is rotated by the clutch-controlled lever through the link 46, thereby causing the balls 42 of the actuator unit to climb the camming surfaces of the discs 44, 44', which results in the movement of the adjusting hub 29 and thrust washer 30 to the left, causing compression of the springs 25 of the clutch. The drag imposed upon the spring housing by the frictional contact of the thrust collar therewith immediately releases the balls 26, allowing them to roll to the base of the cams and the consequent movement of the primary disc away from the first rotary disc 13. The driven shaft, by virtue of this release operation, no longer takes the drive from the driving shaft.

It will be recognized that this form of release operating mechanism requires a minimum amount of effort on the part of the operator of the clutch, and the employment in the clutch mechanism of the servo form of camming action insures a positive and powerful clutch for the reduced size thereof as compared with the clutch devices employed for the corresponding purposes at the present time.

Other changes and adaptations of the invention may be made without departing from the spirit thereof as defined by the appended claims.

I claim:

1. Clutch mechanism of the class described comprising a driving shaft, a driven shaft, a rotary disc connected for rotation with the driving shaft, a primary disc at one side of the rotary disc, a secondary disc at the opposite side of said rotary disc and having a lateral extension surrounding the driving shaft, spring-actuated means mounted on the lateral extension of the secondary disc and connected to the primary disc, operating means for shifting the spring-actuated means comprising an adjusting hub, an actuator disc having threaded connection with said hub, means for holding the actuator disc in adjustable relation to the hub, means for rotating the actuator disc, and means for shifting the actuator disc and hub with relation to the spring-actuated means to effect engagement and disengagement of the clutch plates.

2. A clutch and operating mechanism therefor as set forth in claim 1, wherein the means for shifting the actuator disc and hub comprises balls and camming discs and a backing disc between which and the actuator disc said camming discs and balls are disposed.

3. An operating mechanism for effecting clutch engagement and release comprising an actuator disc to which a clutch lever is adapted to be connected for rotating said disc relative to a driving shaft, a hub member threaded to receive the actuator disc, a relatively stationary backing disc at one side of the actuator disc on said hub, camming means between the actuator disc and hub for shifting the actuator disc and hub axially of the driving shaft, and means for locking said actuator disc relative to the hub for rotation as a unit, said locking means being releasable to permit adjustment of the hub for taking up wear.

4. Operating mechanism for effecting clutch engagement and release as set forth in claim 3, wherein the camming means comprises adjustable toggle means intermediate said actuator disc and backing disc effective upon rotation of the actuator disc to shift the actuator disc axially of the shaft.

HOMER T. LAMBERT.

REFERENCES CITED

The following references are of record in the file of this patent:

UNITED STATES PATENTS

| Number | Name | Date |
| --- | --- | --- |
| 787,072 | Brush | Apr. 11, 1905 |
| 1,683,715 | Erban | Sept. 11, 1928 |
| 2,162,071 | Eason | June 13, 1939 |
| 2,163,028 | Foster | June 20, 1939 |
| 2,372,750 | Tompkins | Apr. 3, 1945 |

FOREIGN PATENTS

| Number | Country | Date |
| --- | --- | --- |
| 817,815 | France | May 31, 1937 |